United States Patent
Acker et al.

(10) Patent No.: US 7,263,697 B2
(45) Date of Patent: Aug. 28, 2007

(54) COMPOSITE COMPUTER PROGRAM EXTENSIONS

(75) Inventors: Michael Acker, Grossfischlingen (DE); Georg Wilhelm, Kronau (DE); Juergen Remmel, Muhlhausen (DE); Rainer Dattke, Bruchsal (DE); Sigrun Wintzheimer, Hambrucken (DE); Steffi Kramer, Munich (DE)

(73) Assignee: SAP Aktiengesellschaft, Walldorf (DE)

( * ) Notice: Subject to any disclaimer, the term of this patent is extended or adjusted under 35 U.S.C. 154(b) by 636 days.

(21) Appl. No.: 10/347,122

(22) Filed: Jan. 17, 2003

(65) Prior Publication Data

US 2004/0143723 A1    Jul. 22, 2004

(51) Int. Cl.
*G06F 9/44* (2006.01)

(52) U.S. Cl. .................................. 717/168

(58) Field of Classification Search ........ 717/168–173, 717/104–108; 707/103, 203; 719/332
See application file for complete search history.

(56) References Cited

U.S. PATENT DOCUMENTS

| | | | |
|---|---|---|---|
| 6,085,120 A | 7/2000 | Schwerdtfeger et al. | |
| 6,169,993 B1* | 1/2001 | Shutt et al. | 707/103 R |
| 6,182,274 B1* | 1/2001 | Lau | 717/104 |
| 6,708,186 B1* | 3/2004 | Claborn et al. | 707/102 |
| 6,874,143 B1* | 3/2005 | Murray et al. | 717/173 |
| 6,968,538 B2* | 11/2005 | Rust et al. | 717/108 |
| 2002/0161796 A1* | 10/2002 | Sylthe | 707/500 |
| 2002/0184226 A1 | 12/2002 | Klicnik et al. | |
| 2002/0188629 A1* | 12/2002 | Burfoot | 707/503 |
| 2003/0225937 A1* | 12/2003 | Reiss et al. | 709/332 |
| 2004/0006506 A1* | 1/2004 | Hoang | 705/10 |
| 2004/0054696 A1* | 3/2004 | Sheinis et al. | 707/201 |
| 2004/0117799 A1* | 6/2004 | Brockway et al. | 719/310 |
| 2004/0153536 A1* | 8/2004 | Strassner | 709/223 |
| 2004/0172441 A1* | 9/2004 | Beringer et al. | 709/200 |
| 2005/0289535 A1* | 12/2005 | Murray et al. | 717/172 |

FOREIGN PATENT DOCUMENTS

DE    199 09 715 A    9/2000

(Continued)

OTHER PUBLICATIONS

Wilfred NG, "An Extension of the Relational Data Model to Incorporate Ordered Domains", Sep. 2001, ACM Press, vol. 26, No. 3, pp. 344-383.*

(Continued)

*Primary Examiner*—Wei Zhen
*Assistant Examiner*—Anna Deng
(74) *Attorney, Agent, or Firm*—Fish & Richardson P.C.

(57) ABSTRACT

Methods and apparatus, including computer program products, providing and using composite extension definitions. A composite extension definition has one or more extension definitions, each of which can be either an atomic or a non-atomic extension definition. In one aspect, a program has instructions to create a composite extension definition, to generate composite metadata that represents the composite extension definition, and to store the composite metadata for later use. The program can include instructions to receive input specifying dependency relationships between or among extensions defined by the extension definitions and to include the relationships in the composite metadata. Composite extension definitions can be created by an application developer for use by customers to guide them in implementing and deploying extensions to a computer program application.

14 Claims, 4 Drawing Sheets

FOREIGN PATENT DOCUMENTS

WO          WO 01/39046 A        5/2001

OTHER PUBLICATIONS

C. Pronk, et. al. Standardized Extensions to Modula-2', Nov. 1997, ACM Press, vol. 32, Issue 11, pp. 34-48.*

Anonymous, "Business Add-Ins," SAP Library, Jul. 24, 2002, retrieved from the Internet on Sep. 16, 2004, at http://help.sap.com/saphelp_46c/helpdata/en/ee/a1d548892b11d295d60000e82de14a/frameset.htm, pp. 1-15, XP002296620.

Clarkson, J., "Creating Add-Ins in Microsoft Excel 97," Apr. 1999, retrieved from the Internet on Sep. 13, 2004, at http://msdn.microsoft.com/library/default.asp?url=/library/enus/dnexcel9/html/xlcraddns.asp, pp. 1-3, XP002296622.

Kremp, J., "Re: MIGO—User Exit," Jul. 24, 2002, retrieved from the Internet on Sep. 16, 2004, at http://groups.google.com/groups?selm=ahm8et%24s3h%241%40news1.wdf.sapag.de&output=gplain, 1 pg., XP002296621.

\* cited by examiner

COMPOSITE COMPUTER PROGRAM EXTENSIONS

BACKGROUND

The present invention relates to data processing by digital computer, and more particularly to extending a standard application.

Customers of a standard software application may need to extend the standard application to add customer-specific features that are not implemented by the standard application. In addition, customers of the standard application may also need to customize the features of the standard application by providing customer-specific extensions for the features implemented by the standard application. There are many different approaches for providing customer-specific application extensions. For example, SAP R/3, available from SAP AG of Walldorf (Baden) Germany, supports customer-specific extensions by defining Business Transaction Events, User Exit, Business Add-In, and Append methods.

Customers can enhance a standard application by implementing a number of individual atomic extensions. Each atomic extension generally implements an isolated customer-specific feature. A particular extension scenario may require the implementation of several atomic extensions in order to provide the desired enhancement. Atomic extensions that belong to the same extension scenario may need to be maintained and upgraded at the same time. Also, several different extension scenarios may share one or more atomic extensions.

SUMMARY OF THE INVENTION

The present invention provides methods and apparatus, including computer program products, providing and using composite extension definitions. A composite extension definition has one or more extension definitions, each of which can be either an atomic or a non-atomic extension definition.

In general, in one aspect of the invention, a program has instructions to create a composite extension definition, to generate composite metadata that represents the composite extension definition, and to store the composite metadata for later use.

In general, in another aspect, a method in accordance with the invention includes the acts of receiving extension composite metadata that represents a composite extension definition; instantiating the composite extension definition to create a composite extension, the composite extension including each of the atomic extensions defined, directly or indirectly, by the composite extension definition; and deploying the composite extension.

Advantageous implementations of the invention include one or more of the following features. The program includes instructions to receive input specifying dependency relationships defining dependencies between or among extensions defined by the extension definitions and to include the relationships in the composite metadata. The program includes instructions to modify one or more extension definitions and to use the dependencies to indicate to a user any effect of modifying the one or more extension definitions on other extensions defined by the composite extension definition.

The invention can be implemented to realize one or more of the following advantages. An composite extension definition can specify the atomic extension definitions that belong to the same extension scenario. An extension implementation composite can specify atomic extension implementations that belong to the same extension scenario. An composite extension definition can specify extension dependency relationships between the extensions that make up a composite extension. The extension dependency relationships can be used to implement and maintain the extensions that belong to the same composite extension. Composite extension definitions can be created by an application developer for use by customers to guide them in implementing and deploying extensions to a computer program application. One implementation of the invention provides all of the above advantages.

The details of one or more implementations of the invention are set forth in the accompanying drawings and the description below. Further features, aspects, and advantages of the invention will become apparent from the description, the drawings, and the claims.

DETAILED DESCRIPTION

Figure 1:
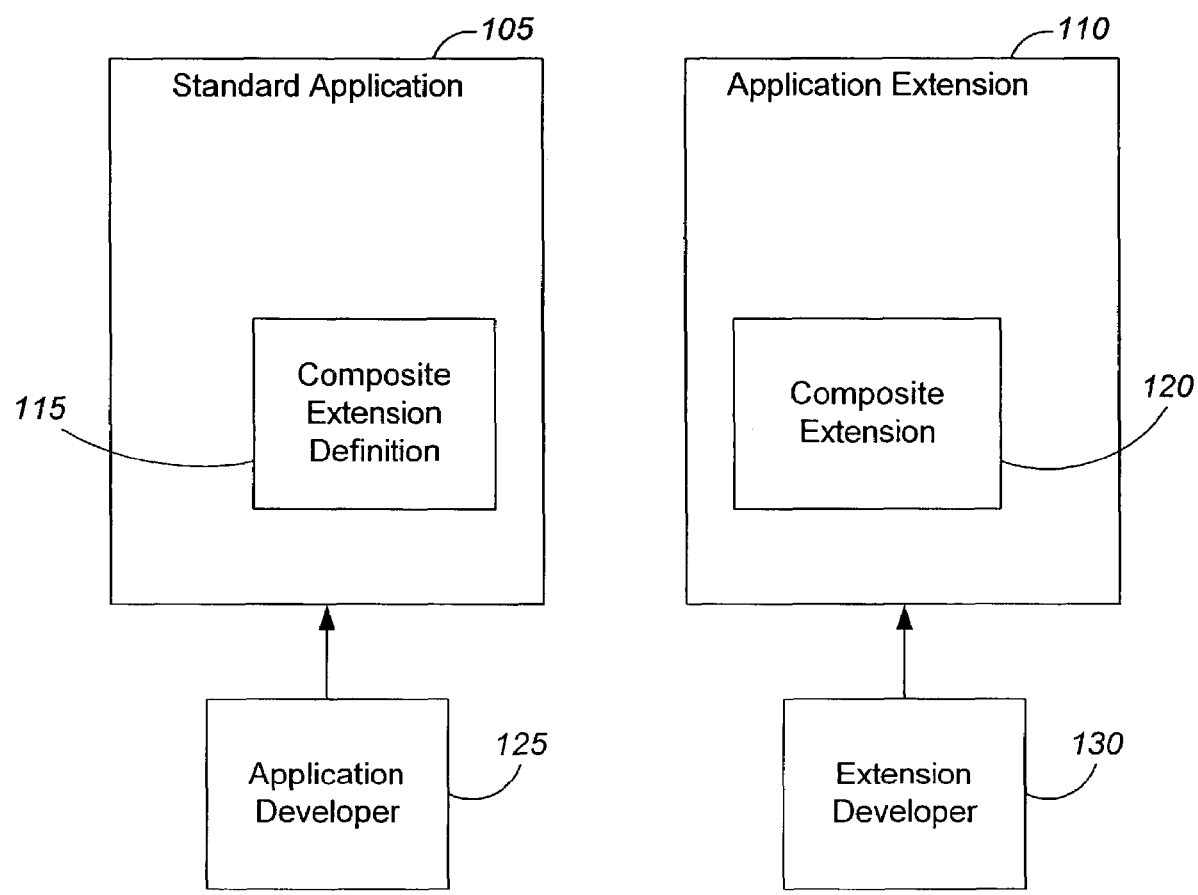
FIG. 1 is a block diagram illustrating the structure and development of a composite extension.

FIG. 1 is a block diagram illustrating the structure and development of a composite extension 120. The composite extension 120 is used to provide enhancements for a standard application 105 using an application extension 110. Application extensions are used by customers of the standard application 105 to enhance existing features or add new features for the standard application 105. The standard application 105 is developed by an application developer 125, and the application extension 110 is developed by an extension developer 130. The extension developer 130 can be a customer of the application developer 125, or a third party extension developer distinct from the customer or the application developer 125. The application developer 125 and the extension developer 130 can be the same entity—for example, the application developer 125 may want to provide customer-specific features for a standard application 105 without making them part of the standard application 105. The standard application 105 can have more than one associated composite extension. Each composite extension 120 can be used to address a different extension scenario or the requirements of a particular customer of the standard application 105.

The extension developer 130 generates the composite extension 120 by instantiating the composite extension definition 115. Instantiating the composite extension definition 115 generates a skeleton implementation of the composite extension. The extension developer 130 uses the skeleton implementation to implement the composite extension. The composite extension definition 115 is part of the standard application 105. The composite extension 120 is part of the application extension 110. The composite extension definition 115 is provided by the application developer 120. The composite extension 120 is developed by the extension developer 130 using the composite extension definition 115.

Figure 2:
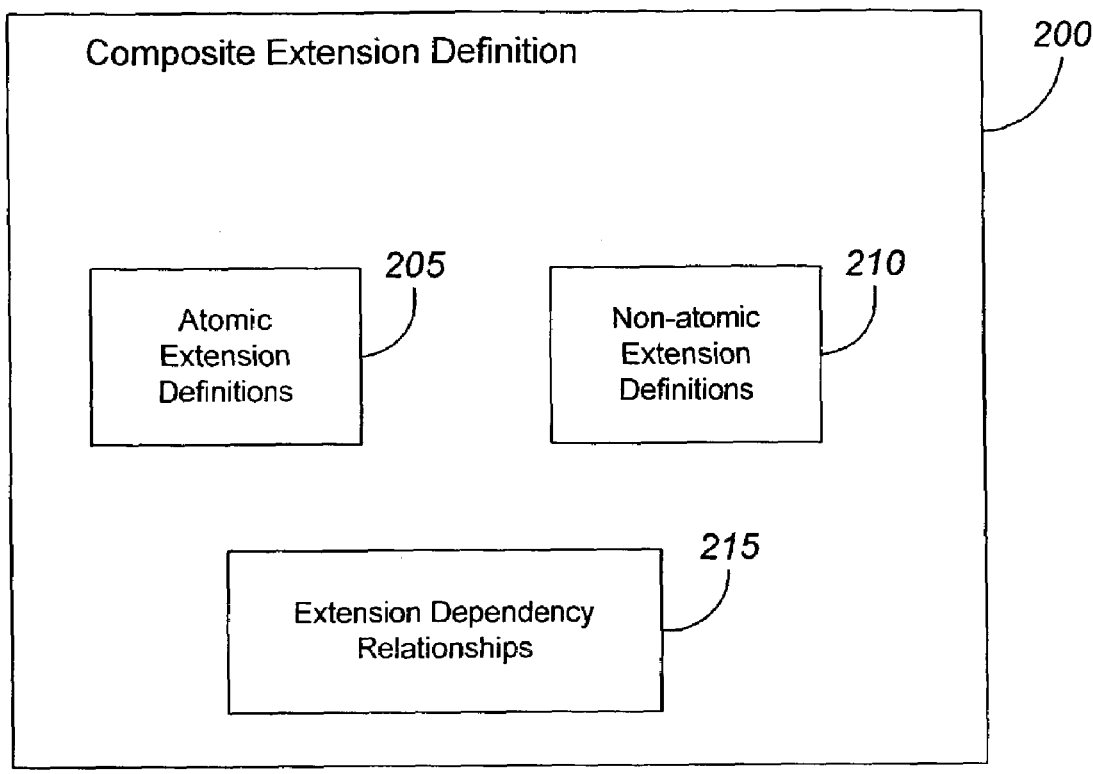
FIG. 2 illustrates the components of an composite extension definition.

FIG. 2 illustrates the components of a composite extension definition 200 that can be defined by an application developer. The composite extension definition 200 can include zero or more atomic extension definitions 205. In addition, the composite extension definition 200 can also include zero or more non-atomic extension definitions 210. Each non-atomic extension definition 210 corresponds to a composite extension definition that can include atomic extension definitions and non-atomic extension definitions. The composite extension definition 200 can include extension dependency relationships 215 that specify the relationships between the extensions included in the composite extension definition 200. The extension dependency relationships 215, if any, are specified by the application developer. In one exemplary implementation, the extension dependency relationships 215 are used to specify that the modification of one extension implementation requires the modification of another extension implementation. In another exemplary implementation, the extension dependency relationships 215 are used to specify multiple extensions that must be implemented together in order to provide a particular enhancement for a standard application. Multiple composite extension definitions 200 of a standard application can include one or more atomic extension definitions 205 and non-atomic extension definitions 210, that are the same.

Figure 3:
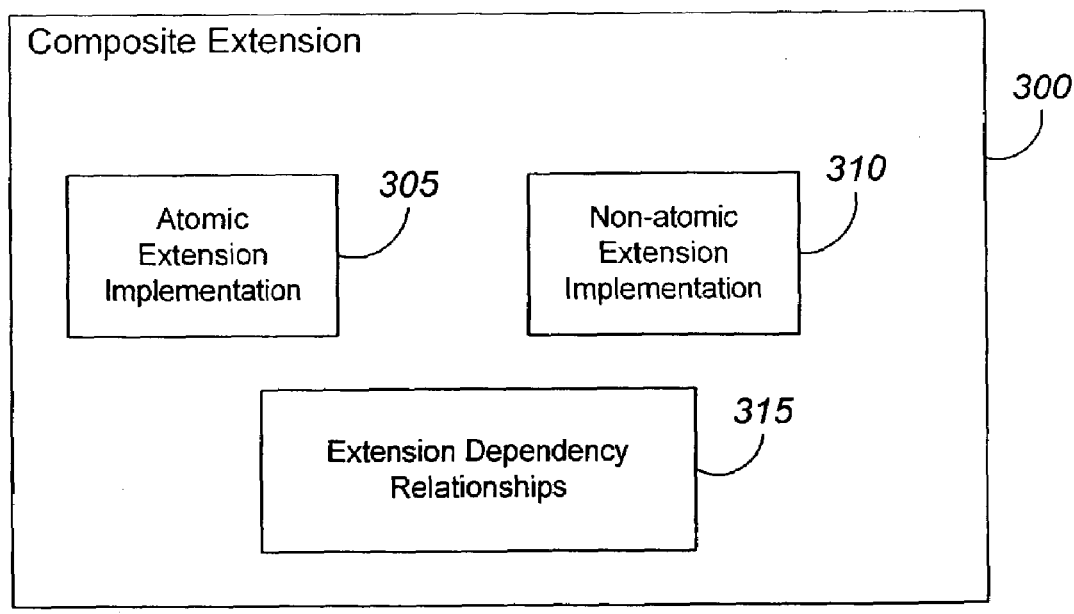
FIG. 3 illustrates the components of a composite extension.

FIG. 3 illustrates the components of a composite extension 300, which is provided by an extension developer. The composite extension 300 can include any number of extension implementations, which can be atomic extension implementations 305, non-atomic extension implementations 310, or both. Each non-atomic extension implementation 310 corresponds to a composite extension that can include its own atomic extension implementations and non atomic extension implementations. The extension dependency relationships 315, if any, defined by the application developer are also part of the composite extension 300. The extension dependency relationships can be used to specify and enforce the relationships between the extensions that are part of the composite extension 300.

Figure 4:
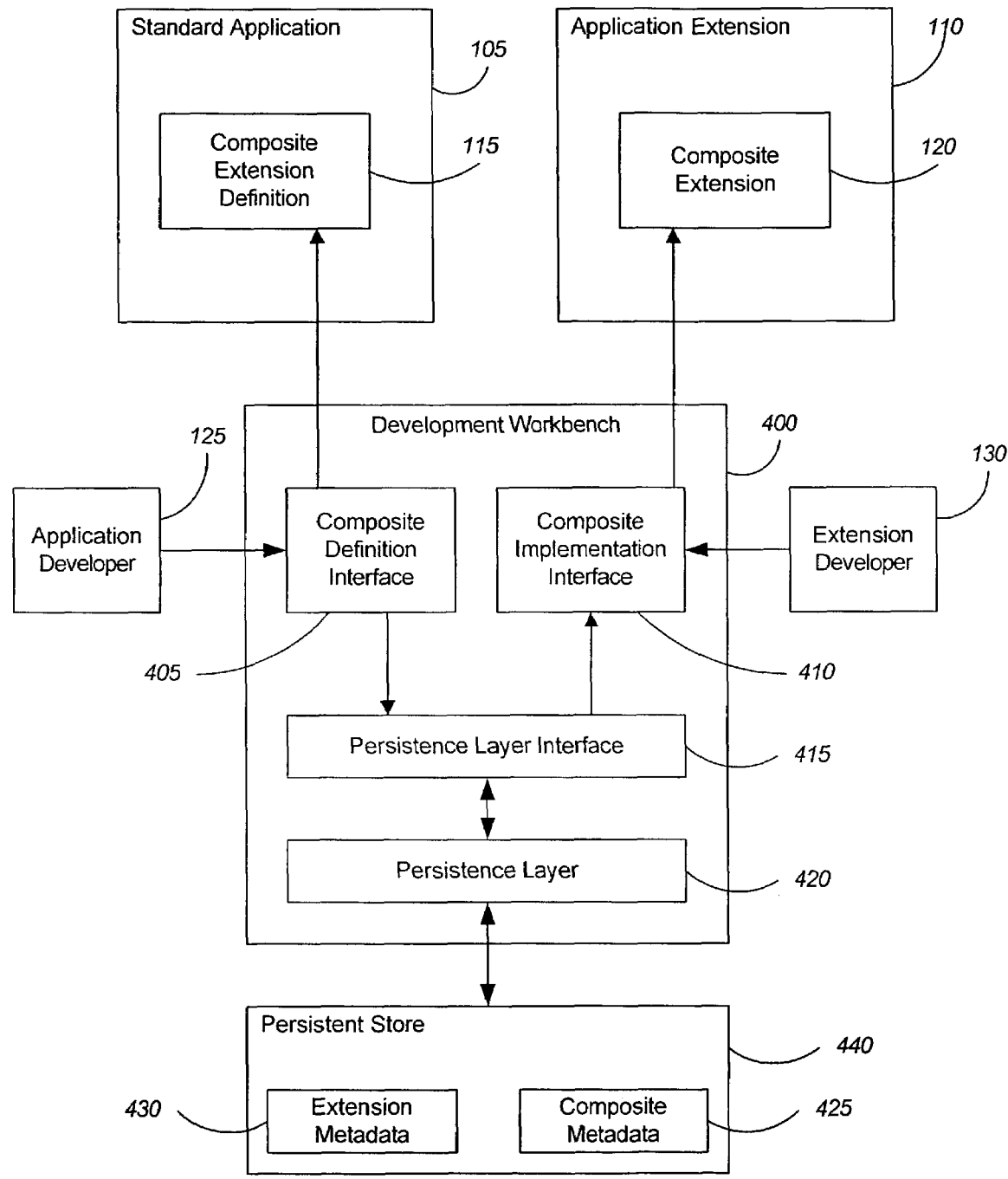
FIG. 4 illustrates a development workbench that can be used to provide composite extensions.

FIG. 4 and FIG. 1 illustrate a development workbench 400 that can be used to provide composite extensions 120. The development workbench 400 includes a composite definition interface 405, a composite implementation interface 410, and a persistence layer interface 415 through which is accessed a persistence layer 420. The composite definition interface 405 can be used by the application developer 125 to provide a composite extension definition 115. The application developer 125 can use the composite definition interface 405 to generate atomic extension definitions and non-atomic extension definitions, as well as specify the dependency relationships between these extensions. Extension dependency relationships are created by the composite definition interface 405, based on input from the application developer 125. The composite extension definition 115 is stored by the development workbench 400 as composite metadata 425 in a persistent store 440 through a persistence layer 420. In addition, additional information required by the extension developer 130 to develop the extensions can be stored as extension metadata 430 through the persistence layer 420. In one exemplary implementation, the composite metadata 425 can be stored as an XML file.

As shown in FIG. 4, the extension developer 130 implements the extensions using the composite implementation interface 410. The composite implementation interface 410 retrieves the composite metadata 425 through the persistence layer 420. The composite metadata 425 is used by the composite implementation interface 410 to indicate the extension dependency relationships to the extension developer. The composite metadata 425 can also be used by the composite implementation interface 410 to enforce the extension dependency relationships 215. In one implementation of the disclosed technique, the composite definition interface 405 can be implemented using a composite definition wizard and the composite implementation interface 410 can implemented using a composite implementation wizard. The composite definition wizard can prompt the application developer 125 for the information required to generate the composite metadata 425 and the extension metadata 430. The composite implementation wizard can use the composite metadata 425 and the extension metadata 430 to generate information required by the extension developer 130 to implement the composite extension 120. In another implementation, the extension dependency relationships are defined in a dependency file having a predefined format and the development workbench 400 uses the dependency file to generate the composite metadata 430.

The application developer 125 can modify the composite extension definition 115 using the composite definition interface 405. Modifications of the composite extension definition 115 can include adding new atomic extension definitions or non-atomic extension definitions to the composite extension definition 115. Modifications of the composite extension definition 115 can also include removing existing atomic extension definitions or non-atomic extension definitions that are part of the composite extension definition 115. Modifications of the composite extension definition 115 must be performed through the composite definition interface 405. The development workbench uses the extension dependency relationships described by the composite metadata 425 to indicate the atomic extensions and non-atomic extension affected by the modification of a composite extension definition 115. Both the application developer 125 and the extension developer 130 can search for an atomic extension definition or a non-atomic extension definition using the development workbench 400.

Figure 5:
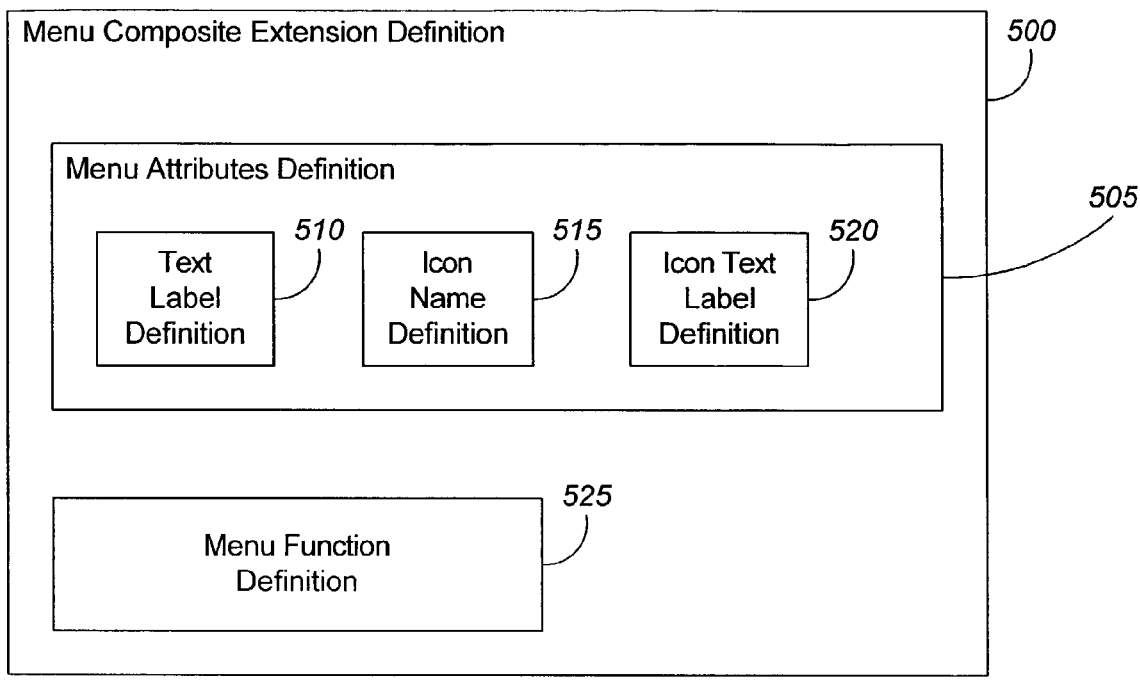
FIG. 5 illustrates an example of a menu composite extension definition.

FIG. 5 illustrates an example of a menu composite extension definition 500. The menu composite extension definition 500 is provided by an application developer. The menu composite extension definition 500 allows customers to add customer-specific enhancements to the user interface of the standard application. The menu composite extension definition 500 includes a menu function definition 525, and the menu attributes definition 505 for the menu extension. The menu attributes definition 505 includes a text label definition 510, an icon name definition 515, and an icon text label definition 520. The menu function definition 525 defines the menu function that is provided by the extension developer 130 to implement the enhancement. The text label definition 510 defines a text label that can be provided for the enhancement. The icon name definition 515 defines an icon image and the icon text label definition defines an icon text label that can be provided for the enhancement.

Figure 6:
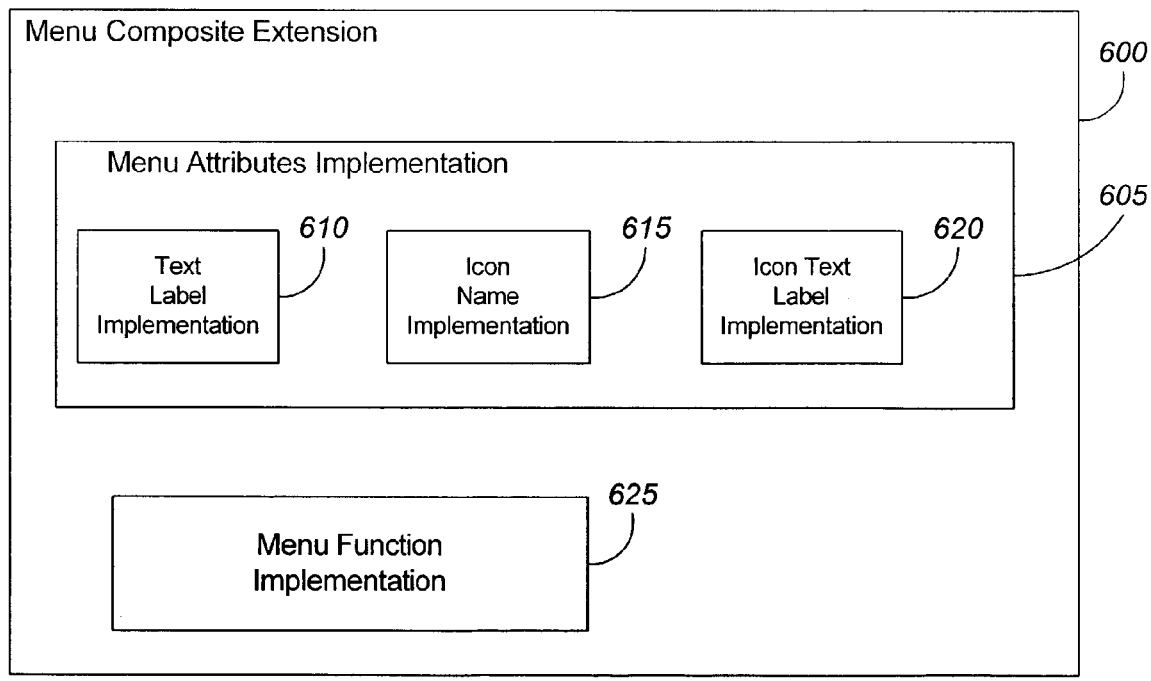
FIG. 6 illustrates an example of a menu composite extension.

FIG. 6 illustrates an example of a menu composite extension 600 that corresponds to the menu composite extension definition 500 illustrated in FIG. 5. The menu composite extension 600 is provided by the extension developer. The menu composite extension 600 includes a menu function implementation 625, and the menu attributes implementation 605 for the menu extension. The menu attributes implementation 605 includes a text label implementation 610, an icon name implementation 615, and an icon text label implementation 620. The menu function implementation 625 implements the menu function that is provided by the extension developer to implement the enhancement. The text label implementation 610 provides a text label for the enhancement. The icon name implementation 615 provides an icon image and the icon text label implementation 620 provides an icon text label for the enhancement. In one exemplary implementation, the menu composite extension definition 500 (FIG. 5) requires that the text label implementation 610 and the menu function implementation 625 be provided by an extension developer in order to implement a menu composite extension. This requirement can be enforced by the extension implementation interface, e.g., the composite implementation interface 410 (FIG. 4), by prompting the extension developer to provide both the text label implementation 610 and the menu function implementation 625.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product tangibly embodied in a machine-readable storage device, the product comprising instructions operable to cause data processing apparatus to:
   create a composite extension definition, the composite extension definition including extension definitions, the extension definitions being atomic extension definitions or non-atomic extension definitions;
   generate composite metadata that represents the composite extension definition, wherein the instructions to generate composite metadata comprise instructions to receive input specifying dependency relationships and to generate the composite metadata including the dependency relationships, the dependency relationships specifying one or more dependencies between or among atomic or non-atomic extensions defined by definitions in the composite extension definition;
   store the composite metadata;
   receive an input from a user to modify a first extension definition;
   modify one or more extension definitions; and
   use the dependencies to indicate to the user any effect of the modification of the first extension definitions on a second extension included in the composite extension definition.

2. The computer program product of claim 1, wherein:
   the instructions to create a composite extension definition comprise instructions to call a wizard.

3. The computer program product of claim 1, wherein:
   the instructions to receive input comprise instructions to receive the dependency relationships from an application developer using a user interface.

4. The computer program product of claim 1, wherein:
the instructions to receive input comprise instructions to receive the dependency relationships from a file.

5. The computer program product of claim 1, wherein:
the instructions to store the composite metadata comprise instructions to store the composite metadata as an XML file.

6. The computer program product of claim 1, wherein:
the instructions to store the composite metadata comprise instructions to store the composite metadata through a persistence layer using a persistence layer interface.

7. A computer implemented method, comprising:
receiving extension composite metadata, the extension composite metadata representing a composite extension definition, the composite extension definition including one or more extension definitions, the extension definitions being atomic extension definitions or non-atomic extension definitions, wherein the extension composite metadata defines dependency relationships between or among extensions defined by the extension definitions;
instantiating the composite extension definition to create a composite extension, the composite extension including each of the atomic extensions defined, directly or indirectly, by the composite extension definition;
deploying the composite extension;
receiving an input from a user to modify the one or more extension definitions;
modifying one or more extension definitions; and
using the dependencies to indicate to the user any effect of the modification of the one or more extension definitions on other extensions included in the composite extension definition.

8. The method of claim 7, wherein:
receiving the extension composite metadata comprises retrieving the extension composite metadata through a persistence layer using a persistence layer interface.

9. A method, comprising:
creating a composite extension definition, the composite extension definition including extension definitions, the extension definitions being atomic extension definitions or non-atomic extension definitions;
generating composite metadata that represents the composite extension definition, wherein generating composite metadata comprise receiving input specifying dependency relationships and generating the composite metadata including the dependency relationships, the dependency relationships specifying one or more dependencies between or among atomic or non-atomic extensions defined by definitions in the composite extension definition;
storing the composite metadata;
receiving an input from a user to modify a first extension definitions;
modifying one or more extension definitions; and
using the dependencies to indicate to the user any effect of the modification of the first extension definitions on a second extension included in the composite extension definition.

10. The method of claim 9, wherein:
creating a composite extension definition comprises calling a wizard.

11. The method of claim 9, wherein:
receiving input comprises receiving the dependency relationships from an application developer using a user interface.

12. The method of claim 9, wherein:
receiving input comprises receiving the dependency relationships from a file.

13. The method of claim 9, wherein:
storing the composite metadata comprises storing the composite metadata as an XML file.

14. The method of claim 9, wherein:
storing the composite metadata comprises storing the composite metadata through a persistence layer using a persistence layer interface.

* * * * *